US006516997B1

(12) United States Patent
Tanazawa et al.

(10) Patent No.: US 6,516,997 B1
(45) Date of Patent: Feb. 11, 2003

(54) USER AUTHENTICATION SYSTEM

(75) Inventors: Takashi Tanazawa, Saitama-Ken (JP); Katsuyoshi Tajima, Saitama-Ken (JP); Yuuji Kobayashi, Saitama-Ken (JP); Isao Arai, Tochigi-Ken (JP)

(73) Assignee: Fuji Electric Co., Ltd., Kanagawa (JP)

( * ) Notice: Subject to any disclaimer, the term of this patent is extended or adjusted under 35 U.S.C. 154(b) by 0 days.

(21) Appl. No.: 09/698,136

(22) Filed: Oct. 30, 2000

(51) Int. Cl.[7] .................................................. G06K 5/00
(52) U.S. Cl. ........................ 235/380; 235/381; 235/375
(58) Field of Search ................................ 235/380, 381, 235/375

(56) References Cited

U.S. PATENT DOCUMENTS

| | | | | | |
|---|---|---|---|---|---|
| 3,401,830 A | | 9/1968 | Mathews | | |
| 3,513,298 A | | 5/1970 | Riddle et al. | | |
| 3,702,392 A | | 11/1972 | St. Jean | ................. | 235/61.7 B |
| 5,450,938 A | | 9/1995 | Rademacher | ............... | 194/206 |
| 5,722,526 A | | 3/1998 | Sharrard | ..................... | 194/346 |
| 5,734,150 A | * | 3/1998 | Brown et al. | ............... | 235/375 |
| 5,770,843 A | * | 6/1998 | Rose et al. | ................. | 235/375 |
| 5,884,289 A | * | 3/1999 | Anderson et al. | ........... | 235/380 |
| 5,902,983 A | * | 5/1999 | Crevelt et al. | ............. | 235/375 |
| 5,907,149 A | * | 5/1999 | Marckini | .................... | 235/380 |

FOREIGN PATENT DOCUMENTS

| | | | |
|---|---|---|---|
| EP | 0 385 400 A2 | | 9/1990 |
| JP | 8-241455 | | 9/1996 |
| JP | 41010578 | * | 4/1998 |
| WO | WO 92/01273 | | 1/1992 |

OTHER PUBLICATIONS

European Search Report dated Jun. 22, 2001.

* cited by examiner

*Primary Examiner*—Michael G. Lee
*Assistant Examiner*—Allyson Sanders
(74) *Attorney, Agent, or Firm*—McDermott, Will & Emery

(57) ABSTRACT

A card issuer first visually confirms that a person who requests the issue of a user card is an adult. The card issuer then issues a user card on which data unique to the card has been previously recorded. The person writes his (her) name, address and the like on the card. The card is then inserted into a card reading section. An apparatus for identifying minors performs certain processing of the data unique to the card read in the card reading section to output an identification number unique to the card, which is displayed on a number display. The user memorizes this identification number as a code number. In buying a product, the user inserts the issued card into the card reading section and, in addition, inputs the code number through a ten key. When the identification number of the card is identical to the input code number, the apparatus for identifying minors outputs a sale permission signal. By virtue of this constitution, the user authentication system makes it difficult to transfer an authentication card to others and, at the same time, can identify minors in a vending machine for alcoholic beverages while ensuring the security through a code number.

4 Claims, 3 Drawing Sheets

1 COIN INPUT PORT
2 DISPLAY FOR AMOUNT OF MONEY
3 RETURN LEVER
4 COIN RETURN PORT
5 MINORS IDENTIFICATION UNIT
6 CARD READING SECTION
7 TEN KEY
8 NUMBER DISPLAY
9 PRODUCT SELECTION BUTTON
10 PRODUCT DELIVERY PORT
11 PRODUCT SAMPLE

USER AUTHENTICATION SYSTEM

FIELD OF THE INVENTION

The invention relates to a user authentication system which can be utilized in the authentication of users, for example, to make it impossible for minors to buy alcohols in vending machines for alcoholic beverages.

BACKGROUND OF THE INVENTION

Vending machines for selling alcoholic beverages, such as canned beers or sake, have hitherto been used. Taking measures for preventing minors from buying alcoholic beverages in these vending machines has been required.

In vending machines for alcoholic beverages and the like, an example of conventional means for preventing minors from buying alcoholic beverages is such that, prior to the purchase of an alcoholic beverage, a driver's license is inserted into the vending machine to optically read the date of the purchaser's birth, thereby judging whether or not the purchaser is an adult, and, only when the purchaser has been judged to be an adult, a sale permission lamp is turned on.

A system has also been studied which comprises the steps of: issuing magnetic cards provided with code numbers to adults only; in buying an alcoholic beverage in a vending machine, requiring the purchaser to insert the magnetic card into the vending machine and, in addition, to input a code number through a ten key provided in the vending machine; and turning on a sale permission lamp only when the code number of the card is identical to the number input through the ten key.

The above-described conventional systems, however, involve the following disadvantages. In the conventional system using a driver's license, only a little more than 50% of the whole adult have the driver's license. Therefore, a large number of adults cannot utilize the vending machine, despite the fact that they are adults. Further, buying alcoholic beverages through the utilization of a driver's license gives a bad impression because this conjures up drunken driving.

On the other hand, in the conventional system using a magnetic card, even though the card is lost, any substantial loss hardly occurs and, in addition, the card can be simply reissued. This leads to a fear of the card being transferred to others without scruple. Consequently, cards issued to the adults only are easily transferred to minors. Therefore, disadvantageously, there is a high possibility that the authentication of users through cards makes substantially no sense. Further, for code number checking purposes, it is necessary to adopt either a method wherein a code number is written in data stored in the card and the input number is checked against the code number written in data of the card, or a method wherein code numbers are managed in a center and the input number is checked online against the code numbers managed in the center. Writing a code number directly in the card has a fear of the code number being read by others. On the other hand, the online checking disadvantageously increases communication cost.

SUMMARY OF THE INVENTION

The invention has been made with a view to solving the above problems of the prior art, and it is an object of the invention to provide a user authentication system which can be utilized by all the adults, does not conjure up drunken driving, makes it difficult for the authentication card to be transferred to others, can ensure the security through a code number and, at the same time, has little or no fear of the code number being read by others, and, in addition, does not require online communication for checking the code number.

According to the first feature of the invention, a user authentication system comprises the steps of:

issuing predetermined user cards, which have previously recorded data unique to respective cards, to proper users only;

upon the operation of a utilization object apparatus through the user card, confirming whether or not the user is a proper user through the utilization object apparatus, the utilization object apparatus comprising data reading means for reading the data unique to the user card, card identification number output means for performing certain processing of the data unique to the card read by the data reading means to output an identification number unique to the card, and number input means which can input any number; and in the confirmation of the user, authenticating the user as a proper user only when the identification number output from the card identification number output means is identical to the number input from the number input means. By virtue of this constitution, the user authentication system can be utilized by all the adults, and does not conjure up drunken driving. This system can also ensure the security through a code number and, at the same time, has little or no fear of the code number being read by others, and, in addition, does not require online communication for checking the code number.

In the user authentication system, the user card is preferably constructed so that information, which can specify the user, is written thereon. This makes it difficult for the user card to be transferred to others.

Further, in the user authentication system, preferably, the data reading means can also read fixed data of cards other than the user card and the user is authenticated as a proper user only when the fixed data is subjected to certain processing to output an identification number unique to the card which is then found to be identical to the number input from the number input means. This enables the authentication of the user to be made through the utilization of credit cards or bank cards which the user already has.

Further, in the user authentication system, preferably, the utilization object apparatus is a vending machine which, upon selling of a product through the utilization of the user card, cumulates and stores therein a service point while associating the service point with the data unique to the user card and performs a predetermined service based on the cumulated service point. This motivates the user to store up the service point and in its turn can promote sales of products in the vending machine.

BRIEF DESCRIPTION OF THE DRAWINGS

The invention will be explained in more detail in conjunction with the appended drawings, wherein.

DESCRIPTION OF THE PREFERRED EMBODIMENTS

The preferred embodiments of the invention will be explained in more detail in conjunction with the accompanying drawings.

Figure 1:
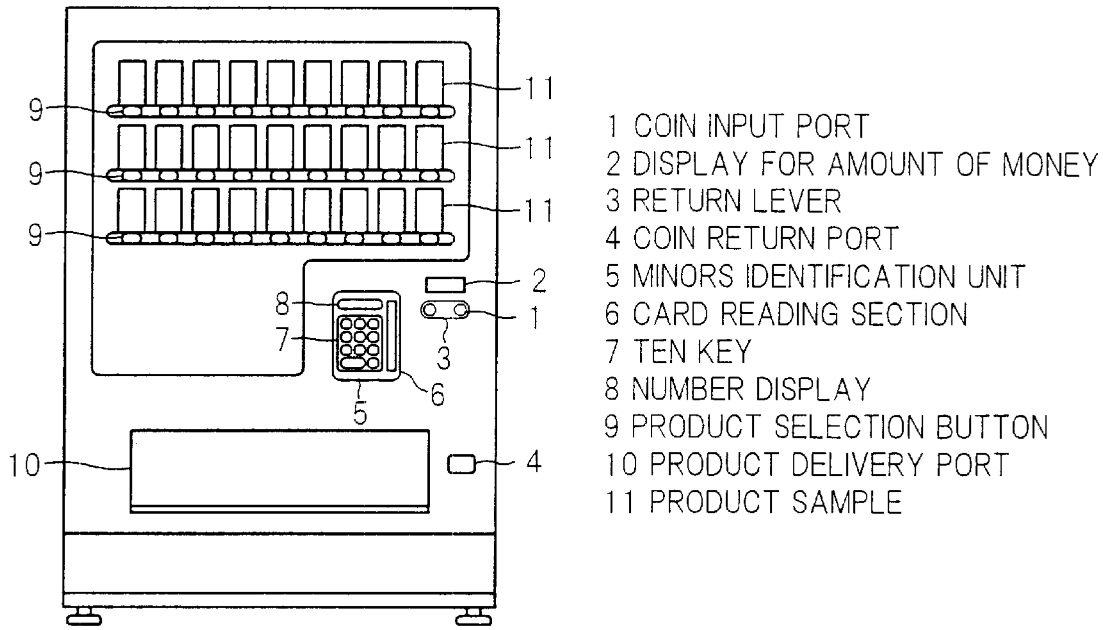
FIG. 1 is a diagram showing the front face of a vending machine to which the invention has been applied.

FIG. 1 is a diagram showing the front face of a vending machine to which the invention has been applied. In FIG. 1, numeral 1 designates a coin inlet port, numeral 2 a display for the amount of money, numeral 3 a return lever, numeral 4 a coin return port, numeral 5 a minors identification unit, numeral 6 a card reading section, numeral 7 a ten key, numeral 8 a number display, numeral 9 a product selection button, numeral 10 a product delivery port, and numeral 11 a product sample.

The minors identification unit 5 is provided in a vending machine for selling alcoholic beverages such as canned beers. The minors identification unit 5 comprises the card reading section 6, the ten key 7, and the number display 8. The card reading section 6 has a groove which permits commonly used cards, such as various credit cards or bank cards in financial institutions, on their magnetic tape layer side to be inserted into and slid thereon. A magnetic head (not shown) for reading data from the magnetic tape layer is provided within the groove. In many cases, the card reading section, for example, in automatic teller machines of banks is of such type that a card is drawn into the apparatus to perform reading. Although this type may be used, there is a problem that the card is likely to be left in the apparatus. This makes it necessary to provide some device for preventing the card from being left in the apparatus. By contrast, the adoption of a card reading section, like this card reading section 6, wherein reading is carried out with the card being in his (her) hand, can prevent the card from being left in the apparatus without the provision of the above special device.

In buying an alcoholic beverage from this vending machine, a card identification number as a code number is input from the ten key 7. The number display 8 is a display for confirming a card identification number, unique to his (her) own card, which is necessary as a code number when the user utilizes this type of vending machine after the request for the utilization of the vending machine. The confirmation of the card identification number may also be carried out by sending display data on its number to the above-described display 2 for the amount of money (FIG. 1) and displaying the data on the display 2. In this case, the provision of the number display 8 may be omitted.

Figure 2:
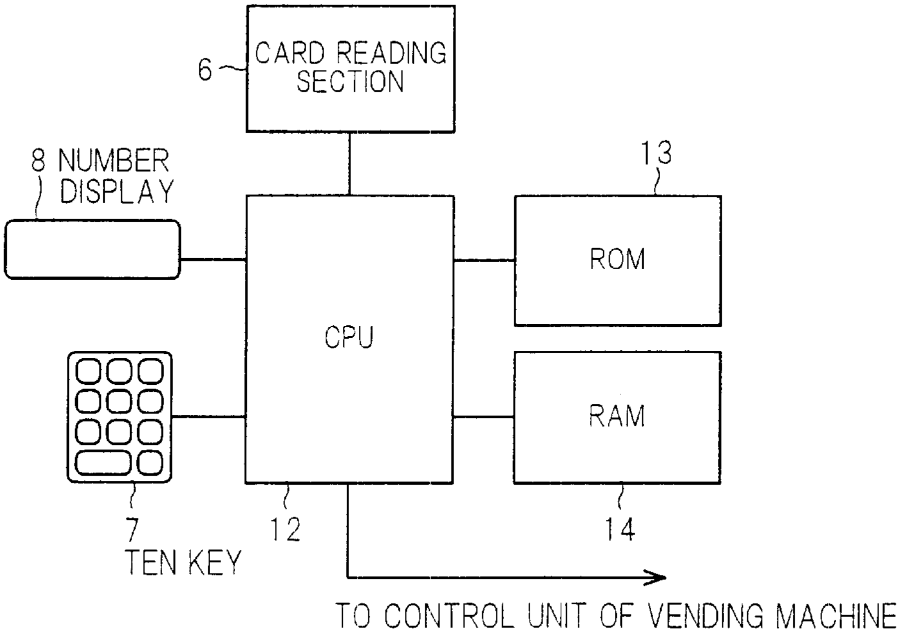
FIG. 2 is a control block diagram of a minors identification unit.

FIG. 2 is a control block diagram of a minors identification unit. The card reading section 6, the ten key 7, and the number display 8 are connected to CPU 12, and controlled by CPU 12 according to a control program written on ROM 13. RAM 14 functions as a working memory for CPU 12. Further, RAM 14 holds a service point for each data unique to the card described later.

Figure 3:
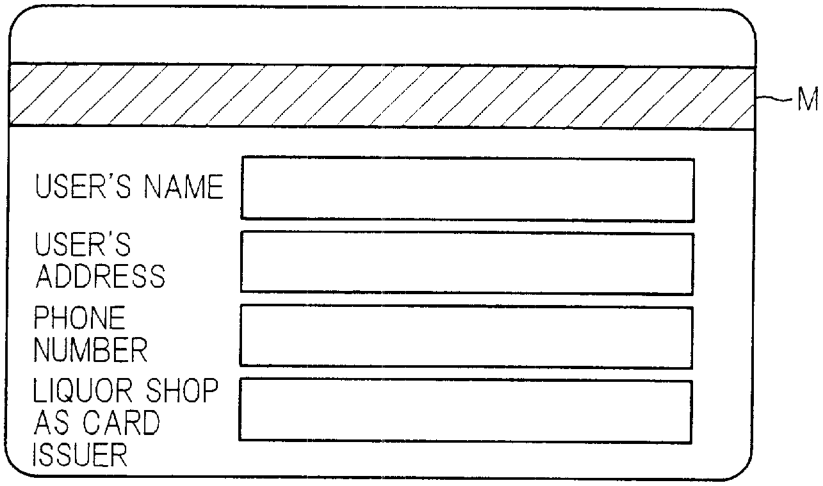
FIG. 3 is a diagram showing a user card.

As shown in FIG. 3, as with various credit cards or bank cards in financial institutions, the user card is provided with a magnetic tape layer M. The magnetic tape layer is located at a position identical to that of the magnetic tape layer provided in the credit cards or the bank cards according to JIS (Japanese Industrial Standards). Data unique to respective cards, such as a series number, are written on the magnetic tape layer M. A code for a shop which issues the card may be included in the data unique to the card. The data unique to the card is previously written on the card, for example, by a vending machine maker. A predetermined number of, for example about 1,000, user cards on which unique data have been written in this way are distributed to each of liquor shops where a vending machine is installed. The name of the shop is written with a pen on a predetermined column in the distributed card on its surface. If necessary, a seal is also put so that the issuer can be confirmed upon the occurrence of a trouble. This can prevent the issue of improper cards.

A customer who wishes to utilize a vending machine provided with the minors identification unit 5 first applies to an administrator, for example, in a liquor shop where the vending machine is installed, for the utilization of the vending machine. The administrator in the liquor shop to which the customer has applied visually makes sure that the customer himself (herself) is not less than 20 years old. If necessary, the administrator may request for the customer to show a driver's license, an identification card or the like. In any event, after the customer is confirmed to be not less than 20 years old, one new user card is taken out and handed to the customer. At that time, the name, address, and phone number of the customer are written with a pen or the like by the customer himself (herself) on a predetermined column in the card on its surface in order to clarify the owner of the card and to make it difficult to transfer the card to others.

Thereafter, in the contemplated vending machine, a control card with control data for starting code number issuing processing being written thereon is passed into the card reading section 6 of the minors identification unit 5 (FIG. 1) provided in the vending machine to start the code number issuing processing. After that, the user card is passed into the card reading section 6 to display, on the number display 8 in the minors identification unit 5, a card identification number which is used from now on as a code number.

The card identification number is prepared by subjecting the data unique to the user card to predetermined certain processing. Processing methods usable herein include, for example, a method wherein data located at predetermined bytes are taken off and are combined and the combination as such is used as a card identification number, a method wherein the taken-off data are used to perform given computation for digitization, a method wherein all the bytes are used to perform given computation for digitization, and a method wherein encryption is carried out for the above identification number. Any of the above methods may be adopted according to need. In any event, when an identical processing method for preparing a card identification number is used in all the object vending machines, the use of an identical card permits an identical card identification number to be given in any of the vending machines.

According to the invention, the user is first informed of the card identification number thus prepared. Thereafter, the utilization of this number as a code number by the user makes it possible to confirm that the person who is about to use the card is a true owner of the card. The application of this to vending machines which should limit purchasers to a specific class of humans, such as vending machines for alcoholic beverages, makes it possible to discriminate whether or not a person, who is about to buy an alcoholic beverage from that vending machine, should be permitted to buy the alcoholic beverage. Next, the code number issuing processing in the minors identification unit 5 will be described with reference to a flow chart.

Figure 4:
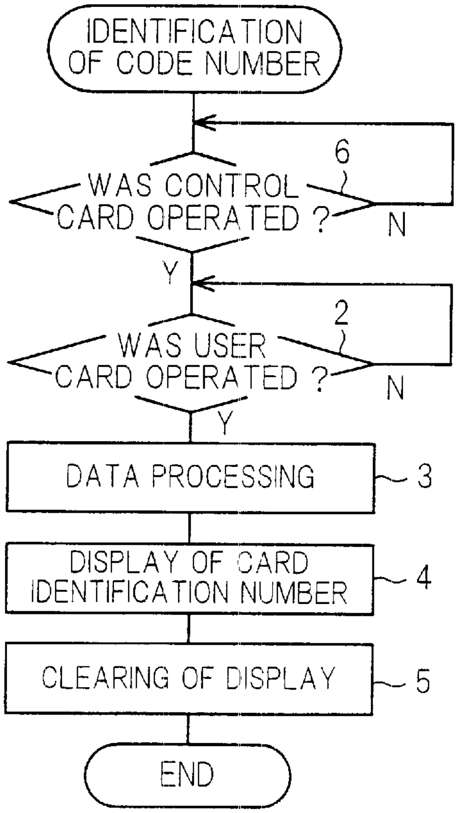
FIG. 4 is a flow chart showing code number issuing processing in a minors identification unit.

FIG. 4 is a flow chart showing code number issuing processing in a minors identification unit.

Step 1 . . . Judgment is made on whether or not a control card for code number issuing processing in a card reading section 6 as data reading means has been operated.

Step 2 . . . If the control card was operated, then judgment is made on whether or not the user card has been operated.

Step 3 . . . If the user card was operated, then data read at the time of operation are used to perform certain processing common to all the vending machines to determine a card identification number in a predetermined figures (for example, three figures) (card identification number output means).

Step 4 . . . The determined card identification number is displayed on a number display 8. At that time, the user memorizes the displayed number as a code number, for example, by making notes of the displayed number.

Step 5 . . . After the elapse of a predetermined time, the display is cleared to end the processing.

Thus, the code number of the user card can be learned. The purchase of an alcoholic beverage from the vending machine using the user card and the code number will be described. The user card is first operated in the card reading section 6 of the minors identification unit 5. Thereafter, the code number is input by operating the ten key 7. At that time, the minors identification unit 5 is processed as follows.

Figure 5:
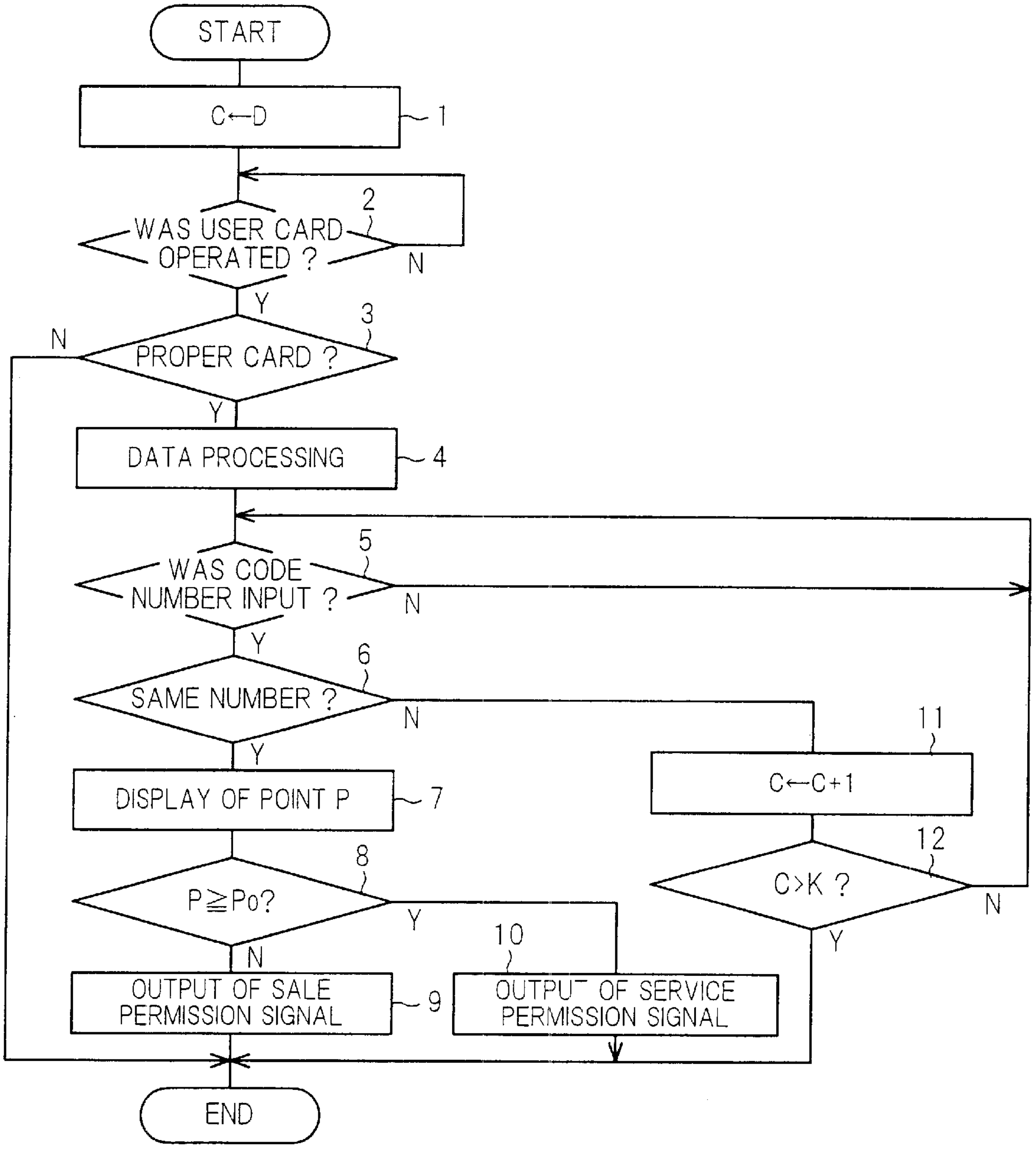
FIG. 5 is a flow chart showing minors identification processing in a minors identification unit.

FIG. 5 is a flow chart showing minors identification processing in the minors identification unit.

Step 1 . . . At the outset, the count value C of a counter or counting the number of times of erroneous input of code number is brought to 0 (zero).

Step 2 . . . Judgment is made on whether or not the user card has been operated in the card reading section 6 as data reading means.

Step 3 . . . If the user card was operated, then judgment is made on whether or not the card is a proper user card.

Step 4 . . . If the user card was a proper user card, then data, which are unique to the card and had been read at the time of operation, are used to perform certain processing common to all the vending machines to determine a card identification number in a predetermined figures (card identification number output means).

Step 5 . . . Judgment is made on whether or not the code number has been input through the ten key 7 as number input means.

Step 6 . . . If there was input of the code number, then judgment is made on whether or not the card identification number determined in step 4 is identical to the code number input in step 5.

Step 7 . . . When both the numbers are identical to each other, the person, who is about to buy a product, is judged to be a proper user but not a minor. In this case, the cumulative service point P in the number unique to the user card now in use is read from RAM 14 and displayed on the number display 8 (or display 2 for the amount of money).

Step 8 . . . Judgment is made on whether or not the cumulative service point P is not less than a predetermined point P0.

Step 9 . . . If the cumulative service point P does not reach the predetermined point P0, a sale permission signal for usual sale is output to the control unit of the body of the vending machine.

Step 10 . . . On the other hand, if the cumulative service point P is not less than the predetermined point P0, a service permission signal is output to the control unit of the body of the vending machine to perform service.

Step 11 . . . When both the numbers in step 6 are not identical to each other, 1 is added to the count value C in the counter for counting the number of times of erroneous input of code number.

Step 12 . . . Judgment is made on whether or not the count value C exceeds a predetermined number of times K. If the count value C exceeds the predetermined number of times K, the person, who is about to buy a product, is judged to be an improper user, followed by the end of the processing.

As soon as the control unit of the body of the vending machine receives a sale permission signal from the minors identification unit 5 in step 9, the control unit receives a coin put from the coin inlet port 1 and starts the usual selling operation. After the completion of the selling, a service point corresponding to the proceeds from the sale is added to the cumulative service point of the number unique to the user card used. Further, as soon as the control unit receives the service permission signal in step 10, this control unit executes a predetermined service operation.

In this case, suitable service operation may be adopted. Examples thereof include a method wherein, even when any cash is not put yet, a sale permission lamp for a predetermined product is immediately turned on to deliver, as a free gift, a product of which the product selection button 9 has been depressed by the user, a method wherein a cash is paid out from a coin return port 4 to perform cash back, and a method wherein a special product other than products usually sold in the vending machine, for example, something to go with alcohols or a souvenir, is delivered as a free gift. Among these methods, the delivery of the special product other than the products usually sold in the vending machine can be expected to contribute to sales promotion because this can provide a stronger motive to customers store up the service point for receiving, through the service point, a special product not bought with money.

In vending machines wherein both a cash and a card can be used, it is common practice to adopt a method wherein a cash price for buying a product with cash is set separately from a card price for buying a product with a card so as to provide a difference in price between both the purchase forms. In the service operation, when a product, which is sold in the vending machine, is delivered as a free gift, a method may be adopted wherein the point is converted into the amount of money by multiplying a predetermined ratio by the point, followed by processing using the card price. This can eliminate the need to set a new price.

Regarding the sequence of the series of card operations and the input of the coin or paper money, in the case of selling only products, of which selling to minors is regulated, such as alcoholic beverages, a conventional method is such that, after the card is first operated, a coin is put into the vending machine, followed by the depression of a product selection button. When alcoholic beverages are sold together with non-regulated general beverages in an identical vending machine, however, it is preferred to use a method wherein, after the coin is first put into the vending machine, the card is operated only when the purchase of an alcoholic beverage is contemplated, followed by the depression of a product selection button.

The above preferred embodiment has been described with reference to the case where specialty cards, which are previously provided in liquor shops, are used as user cards. In addition, a construction may be adopted wherein other cards, for example, various credit cards or bank cards in financial institutions, can also be utilized. Further, a construction may be adopted wherein other specialty cards, for example, magnetic cards having small thickness, such as telephone cards, can also be used. When various credit cards or bank cards in financial institutions are used, fixed data on the owner of the card, such as name, membership number, and number of bank account, written on the magnetic tape layer in the cards are utilized as data unique to the cards and are subjected to predetermined data processing to prepare a card identification number.

The method for providing the service point may vary depending upon liquor shops where the vending machine is installed. For example, a code for a shop as a card issuer is contained in the data unique to the user card, and the addition of a point is performed only when a user card having this code is used, while, in the other cases, only selling of a product is performed without the addition of the point. This enables the service to be carried out only in the specific shop. Thus, this specific shop can be differentiated from other shops.

Further, a method may be adopted wherein the customer can select whether or not he or she receives the point service. In this case, in receiving the user card, the customer declares whether or not he or she receives the point service. When the customer does not wish to receive the point service, setting is performed so that data unique to the card does not hold any service point.

When a plurality of vending machines are installed in one place, a method may be adopted wherein these vending machines are connected to each other or one another through a communication line and the output of the sale permission signal and the control of the service point are performed by one of these vending machines. According to this method, the provision of a minors identification unit in one vending machine suffices for the user authentication control of a plurality of vending machines.

Furthermore, there is a method wherein the term of validity for the service point is set and, for a user card which has not been utilized for a given period of time, the point held on data unique to the card is cleared. This can save memory for holding the service point.

An additional method may be used wherein a bonus point may be added, for example, at the time of joining as a member or holding of events. In this case, a construction may be adopted that, at the time of joining as a member or holding of irregular events, an administrator operates an input unit to add the point, while, at the time of regular events, the point is added, for example, through setting of an automatic calendar. A further method usable herein is such that a bonus point is added only to selling of specific products sales of which are particularly to be promoted. In any event, the addition of the bonus point can promote sales.

Further, individual users, who have purchased products, can be identified based on the user card used. This can be utilized to control the amount of alcohol beverages sold, such as beers, for each user within the vending machine, and the amount may be displayed at the time of card operation. This can call the attention of persons, who drink too much, to the too much drinking. Further, an improvement in the number of customers can be expected, for example, through the talk of people.

Further, the user authentication system according to the invention can be applied to identification of minors in vending machines for alcoholic beverages, as well as to identification of minors in vending machines for cigarettes, cigars or tabaccoes, or other applications where the authentication of users is required, for example, permission of opening or shutting of doors or lockers which are constructed so as to be opened or closed only by specific persons.

By virtue of the above constitution, the invention has the following effects.

Specifically, in the user authentication system according to the first feature of the invention, predetermined user cards, which have previously recorded data unique to respective cards, are issued to proper users only. A utilization object apparatus reads data unique to the user card and performs certain processing of the data unique to the card to output an identification number unique to the card. Only when the identification number is identical to a number input through number input means, the user is authenticated to be a proper user. As a result, the user authentication system can be utilized by all the adults, and does not conjure up drunken driving. This system can also ensure the security through a code number and, at the same time, has little or no fear of the code number being read by others, and, in addition, does not require online communication for checking the code number.

In this user authentication system, the user card is preferably constructed so that information, which can specify the user, is written thereon. This can more effectively prevent the user card from being transferred to others including minors.

Further, the user authentication system is preferably constructed so that fixed data of cards other than the user card can also be read and the user is authenticated as a proper user only when the fixed data is subjected to certain processing to output an identification number unique to the card which is then found to be identical to the number input from the number input means. This enables the authentication of the user to be made through the utilization of credit cards or bank cards which the user already has.

Further, the user authentication system is preferably applied to a vending machine which, upon selling of a product through the utilization of the user card, cumulates and stores therein a service point while associating the service point with the data unique to the user card and performs a predetermined service based on the cumulated service point. This motivates the user to store up the service point and in its turn can promote sales of products in the vending machine.

The invention has been described in detail with particular reference to preferred embodiments, but it will be understood that variations and modifications can be effected within the scope of the invention as set forth in the appended claims.

What is claimed is:

1. A user authentication system comprising steps of:

issuing predetermined user cards, which have previously recorded data unique to respective cards, to proper users only;

upon an operation of a utilization object apparatus through the user card, confirming whether or not the user is a proper user through the utilization object apparatus, the utilization object apparatus comprising data reading means for reading data unique to the user card, card identification number output means for performing certain processing of the data unique to the card read by the data reading means to output an identification number unique to the card, and number input means which can input any number; and in the confirmation of the user, authenticating the user as a proper user only when the identification number output from the card identification number output means is identical to the number input from the number input means, wherein said user authentication system includes a plurality of utilization object apparatuses, said plurality of utilization object apparatuses being connected to each other via a communication line such that authentication of the user as a proper user at one of said plurality of utilization object apparatuses operates to authenticate said user as a proper user at the other utilization object apparatuses.

2. The user authentication system according to claim 1, wherein the user card is constructed so that information, which can specify the user, is written thereon.

3. The user authentication system according to claim 1, wherein the data reading means can also read fixed data of cards other than the user card and the user is authenticated as a proper user only when the fixed data is subjected to certain processing to output an identification number unique to the card which is then found to be identical to the number input from the number input means.

4. The user authentication system according to claim 1, wherein the utilization object apparatus is a vending machine which, upon selling of a product through the utilization of the user card, cumulates and stores therein a service point while associating the service point with the data unique to the user card and performs a predetermined service based on the cumulated service point.

* * * * *